United States Patent
Yu et al.

(10) Patent No.: US 11,411,423 B2
(45) Date of Patent: Aug. 9, 2022

(54) CHARGING CONTROL METHOD, RELATED DEVICE, AND COMPUTER STORAGE MEDIUM

(71) Applicant: Honor Device Co., Ltd., Guangdong (CN)

(72) Inventors: Anfu Yu, Xi'an (CN); Wei Luo, Xi'an (CN); Chao Wang, Xi'an (CN)

(73) Assignee: Honor Device Co., Ltd., Shenzhen (CN)

( * ) Notice: Subject to any disclaimer, the term of this patent is extended or adjusted under 35 U.S.C. 154(b) by 239 days.

(21) Appl. No.: 16/651,724

(22) PCT Filed: Sep. 27, 2018

(86) PCT No.: PCT/CN2018/107791
§ 371 (c)(1),
(2) Date: Mar. 27, 2020

(87) PCT Pub. No.: WO2019/062787
PCT Pub. Date: Apr. 4, 2019

(65) Prior Publication Data
US 2020/0259355 A1   Aug. 13, 2020

(30) Foreign Application Priority Data

Sep. 30, 2017   (CN) .......................... 201710927470.6

(51) Int. Cl.
*H02J 7/00* (2006.01)
*H02J 7/04* (2006.01)

(52) U.S. Cl.
CPC .... *H02J 7/007182* (2020.01); *H02J 7/00308* (2020.01); *H02J 7/04* (2013.01)

(58) Field of Classification Search
USPC .......................................... 320/125, 134–136
See application file for complete search history.

(56) References Cited

U.S. PATENT DOCUMENTS

| 5,625,275 A | * | 4/1997 | Tanikawa | H02J 7/0068 |
| | | | | 320/160 |
| 9,929,576 B2 | * | 3/2018 | Lee | H02J 7/007192 |
| 2010/0231177 A1 | | 9/2010 | Ashida | |

(Continued)

FOREIGN PATENT DOCUMENTS

| CN | 202014109 U | 10/2011 |
| CN | 104638726 A | 5/2015 |

(Continued)

*Primary Examiner* — Samuel Berhanu
(74) *Attorney, Agent, or Firm* — Conley Rose, P.C.

(57) ABSTRACT

A charging device comprises a charging chip and a processor. The charging chip is configured to convert a power supply voltage into a battery voltage to charge the battery, where the power supply voltage is greater than a limiting power supply voltage, and the battery voltage is less than a limiting battery voltage. The processor is configured to: when a first condition is met, increase both the limiting power supply voltage and the limiting battery voltage, or decrease a charging current while increasing the limiting battery voltage; or when a second condition is met, decrease both the limiting power supply voltage and the limiting battery voltage, or increase the charging current while decreasing the limiting battery voltage.

20 Claims, 7 Drawing Sheets

(56) References Cited

U.S. PATENT DOCUMENTS

| | | | | |
|---|---|---|---|---|
| 2013/0257381 A1* | 10/2013 | Diamond | ................ | B60L 53/14 |
| | | | | 320/136 |
| 2016/0049803 A1* | 2/2016 | Hsu | ........................ | H02J 7/045 |
| | | | | 320/162 |
| 2017/0078427 A1 | 3/2017 | Fu et al. | | |
| 2017/0310122 A1* | 10/2017 | Chang | ...................... | H02J 7/00 |

FOREIGN PATENT DOCUMENTS

| | | |
|---|---|---|
| CN | 105098268 A | 11/2015 |
| CN | 205901342 U | 1/2017 |
| CN | 106785134 A | 5/2017 |
| JP | 2010239860 A | 10/2010 |

\* cited by examiner

CHARGING CONTROL METHOD, RELATED DEVICE, AND COMPUTER STORAGE MEDIUM

CROSS-REFERENCE TO RELATED APPLICATIONS

This application is a National Stage of International Application No. PCT/CN2018/107791, filed on Sep. 27, 2018, which claims priority to Chinese Patent Application No. 201710927470.6, filed on Sep. 30, 2017, both of which are hereby incorporated by reference in their entireties.

TECHNICAL FIELD

This application relates to the field of electronic circuit technologies, and in particular, to a charging control method, a related device, and a computer storage medium.

BACKGROUND

With continuous development of technologies such as LCD screen and dual camera, power consumption of a terminal device is increasing. For a given battery capacity of a device, a charging speed is particularly important, and the charging speed even directly affects a user's choice of a device or a product.

FIG. 1 is a schematic structural diagram of a battery charging circuit. As shown in FIG. 1, a charger (also referred to as an adaptor, adaptor) is connected to a USB port of a terminal device by using a universal serial bus (universal serial bus, USB), and outputs a charging voltage Vsys through conversion by a charging chip (charger). The charging voltage can not only be used to charge a battery (battery), but can also be used to supply power for a system load (load). In practice, it is found that the charging speed is affected by many factors, such as an output power of the charger, an impedance of a USB cable, conversion efficiency of the charging chip, dynamic power management (dynamic power management, DPM, hereinafter referred to as Vdpm) of an input voltage of the charging chip, that is, a limiting voltage (a minimum limiting voltage of a VBUS is shown in the figure) at a charging input end of the charging chip, a battery internal resistance, or the like. A setting of a charging chip Vdpm parameter is one of important parameters that affect the charging speed.

In the prior art, to protect charging safety of a device, an initial Vdpm parameter and a constant-voltage (constant-voltage, CV) protection parameter of the battery are generally set immediately after the charger is connected. The constant-voltage protection parameter refers to a limiting voltage at a battery power supply end of the charging chip (a maximum limiting voltage of a VBAT shown in the figure), and the two parameters are not repeatedly set subsequently until an entire charging process of the battery is completed by using the charging chip. However, Vdpm is set only once, that is, Vdpm has only one level, and consequently, the charging speed of the battery cannot be adjusted flexibly, and charging duration is excessively long, especially when a battery voltage is relatively low, the charging speed of the foregoing solution is relatively low, and the charging duration is increased.

SUMMARY

Embodiments of the present invention disclose a charging control method, a related device, and a computer storage medium, so that charging duration can be shortened while charging safety of a terminal device is ensured.

According to a first aspect, an embodiment of the present invention discloses a terminal device, including a charging chip, a processor, and a battery. The charging chip is configured to convert a power supply voltage into a battery voltage to charge the battery, where the power supply voltage is greater than a limiting power supply voltage, the battery voltage is less than a limiting battery voltage, the limiting power supply voltage is a minimum limiting voltage at a charging input end of the charging chip, and the limiting battery voltage is a maximum limiting voltage at a battery power supply end of the charging chip. The processor is configured to: when a first condition is met, increase both the limiting power supply voltage and the limiting battery voltage, or decrease a charging current while increasing the limiting battery voltage; or when a second condition is met, decrease both the limiting power supply voltage and the limiting battery voltage, or increase the charging current while decreasing the limiting battery voltage. The charging current is a current used to charge the battery, the first condition includes at least that the battery voltage is greater than a battery voltage threshold, and the second condition includes at least that the battery voltage is less than the battery voltage threshold.

In this application, to implement charging of the terminal device, a charging circuit is disposed in the terminal device, where the charging circuit includes but is not limited to a switching charging circuit and a linear charging circuit. The charging circuit includes a charging chip, a processor, and a battery, and optionally, may further include other components, such as a load and a peripheral device. To shorten the charging duration of the terminal device, when the charger is connected to the terminal device for charging, related parameters in the charging circuit may be adjusted in this embodiment of this application. For example, in the switching charging circuit, both the limiting power supply voltage Vdpm and the limiting battery voltage (that is, a constant voltage protection parameter) are adjusted based on the battery voltage. In the linear charging circuit, the limiting battery voltage is adjusted, or both the limiting battery voltage and a charging current in the charging circuit are adjusted based on the battery voltage.

By implementing this embodiment of the present invention, the charging duration of the terminal device can be shortened while charging safety of the terminal device is ensured.

In some possible embodiments, when the charging circuit is the switching charging circuit, to be specific, when both the limiting power supply voltage and the limiting battery voltage are increased, the first condition further includes that a test voltage is less than a preset threshold, and/or a target quantity of times exceeds a preset quantity of times. Alternatively, when the charging circuit is the switching charging circuit, to be specific, when both the limiting power supply voltage and the limiting battery voltage are decreased, the second condition further includes that a test voltage is less than a preset threshold, and/or a target quantity of times exceeds a preset quantity of times.

The test voltage refers to a voltage at a charging input end (VBUS) of the charging chip in a charging process of the terminal device. The voltage may be an actual voltage at the charging input end when the terminal device is normally charged, or may refer to a voltage detected when a test current is used to test the charging input end. This is not limited in the present invention. Generally, after preset duration, the voltage at the charging input end may be collected for use as the test voltage, to ensure accuracy of test voltage data.

The target quantity of times is a quantity of times that the test voltage is less than the preset threshold. To avoid a misjudgment and ensure accuracy of parameter adjustment, the terminal device may obtain, for a plurality of times, whether the test voltage is less than the preset threshold. When the quantity of times that the test voltage is less than the preset threshold exceeds the preset quantity of times, it is determined that the related parameters in the charging circuit need to be adjusted. For example, if a quantity of times that the test voltage is less than the preset threshold is at least two in three test voltage judgments, the related parameters in the charging circuit need to be adjusted.

In some possible embodiments, when the charging circuit is the switching charging circuit, to be specific, when both the limiting power supply voltage and the limiting battery voltage are increased, the first condition further includes that the battery voltage is in a rising period.

In some possible embodiments, when the charging circuit is the switching charging circuit, to be specific, when both the limiting power supply voltage and the limiting battery voltage are decreased, the second condition further includes that the battery voltage is in the rising period, or the battery voltage is in a dropping period.

To ensure the accuracy of parameter adjustment, a change trend of the battery voltage may be added to adjust the related parameters in the charging circuit. During specific implementation, the charging chip may collect and record, in real time or periodically, the voltage at the battery power supply end (that is, the battery voltage in this application), and store the voltage. Correspondingly, the processor may analyze the change trend of the battery voltage based on a recorded battery voltage in the preset duration, for example, in the rising period or the dropping period.

In some possible embodiments, when the second condition further includes that the battery voltage is in the rising period, the battery voltage threshold is a first battery voltage threshold; or when the second condition further includes that the battery voltage is in the dropping period, the battery voltage threshold is a second battery voltage threshold. The first battery voltage threshold is greater than the second battery voltage threshold.

According to a second aspect, an embodiment of the present invention discloses a charging control method, to control charging of a terminal device, where the terminal device includes a charging chip, a processor, and a battery, and the method includes:

converting, by the charging chip, a power supply voltage into a battery voltage to charge the battery, where the power supply voltage is greater than a limiting power supply voltage, the battery voltage is less than a limiting battery voltage, the limiting power supply voltage is a minimum limiting voltage at a charging input end of the charging chip, and the limiting battery voltage is a maximum limiting voltage at a battery power supply end of the charging chip; and when a first condition is met, increasing, by the processor, both the limiting power supply voltage and the limiting battery voltage, or decreasing a charging current while increasing the limiting battery voltage; or when a second condition is met, decreasing, by the processor, both the limiting power supply voltage and the limiting battery voltage, or increasing the charging current while decreasing the limiting battery voltage, where the charging current is a current used to charge the battery, the first condition includes at least that the battery voltage is greater than a battery voltage threshold, and the second condition includes at least that the battery voltage is less than a battery voltage threshold.

For content that is not described or not shown in this embodiment of the present invention, refer to related descriptions in the foregoing embodiment of the first aspect. Details are not described herein again.

According to a third aspect, an embodiment of the present invention discloses a terminal device, including a charging chip and a battery.

The charging chip is configured to convert a power supply voltage into a battery voltage to charge the battery, where the power supply voltage is greater than a limiting power supply voltage, the battery voltage is less than a limiting battery voltage, the limiting power supply voltage is a minimum limiting voltage at a charging input end of the charging chip, and the limiting battery voltage is a maximum limiting voltage at a battery power supply end of the charging chip.

The charging chip is configured to: when a first condition is met, increase both the limiting power supply voltage and the limiting battery voltage, or decrease a charging current while increasing the limiting battery voltage; or when a second condition is met, decrease both the limiting power supply voltage and the limiting battery voltage, or increase the charging current while decreasing the limiting battery voltage, where the charging current is a current used to charge the battery, the first condition includes at least that the battery voltage is greater than a battery voltage threshold, and the second condition includes at least that the battery voltage is less than the battery voltage threshold.

For content that is not described or not shown in this embodiment of the present invention, refer to related descriptions in the foregoing embodiment of the first aspect. Details are not described herein again.

According to a fourth aspect, an embodiment of the present invention discloses a charging chip, including a processor and one or more interfaces coupled to the processor.

The processor is configured to convert a power supply voltage into a battery voltage to charge the battery, where the power supply voltage is greater than a limiting power supply voltage, the battery voltage is less than a limiting battery voltage, the limiting power supply voltage is a minimum limiting voltage at a charging input end of the charging chip, and the limiting battery voltage is a maximum limiting voltage at a battery power supply end of the charging chip.

The processor is further configured to: when a first condition is met, increase both the limiting power supply voltage and the limiting battery voltage, or decrease a charging current while increasing the limiting battery voltage; or when a second condition is met, decrease both the limiting power supply voltage and the limiting battery voltage, or increase the charging current while decreasing the limiting battery voltage, where the charging current is a current used to charge the battery, the first condition includes at least that the battery voltage is greater than a battery voltage threshold, and the second condition includes at least that the battery voltage is less than the battery voltage threshold.

According to a fifth aspect, an embodiment of the present invention provides a terminal device, including a memory, a communications interface, and a processor coupled to the memory and the communications interface. The memory is configured to store an instruction. The processor is configured to execute the instruction. The communications interface is configured to communicate with a terminal device under control of the processor. When executing the instruction, the processor performs the method described in the second aspect.

According to a sixth aspect, a computer readable storage medium is provided, where the computer readable storage medium stores program code used for mail transmission, and the program code includes an instruction used to perform the method described in the second aspect.

According to a seventh aspect, a computer program product including an instruction is provided. When the instruction is run on a computer, the computer is enabled to perform the method described in the second aspect.

By implementing this embodiment of the present invention, the charging duration can be shortened while charging safety of the device is ensured.

BRIEF DESCRIPTION OF DRAWINGS

To describe technical solutions in the embodiments of the present invention or in the prior art more clearly, the following briefly describes accompanying drawings required for describing the embodiments or the prior art.

DESCRIPTION OF EMBODIMENTS

The following describes technical solutions in the embodiments of the present invention in detail with reference to accompanying drawings in the present invention.

In a process of proposing this application, an inventor of this application finds that charging of a terminal device is generally divided into four phases: trickle-charge (trickle-charge), pre-charge (pre-charge), constant-current charge (constant-current charge, CC), and constant-voltage charge (constant-voltage charge, CV). The constant-current charge CC is one of phases that mainly affect a charging speed. Generally, designers expect that a time that a terminal device stays in the CC phase is long enough, so that a current is high enough, to correspondingly reduce charging duration.

Figure 1:
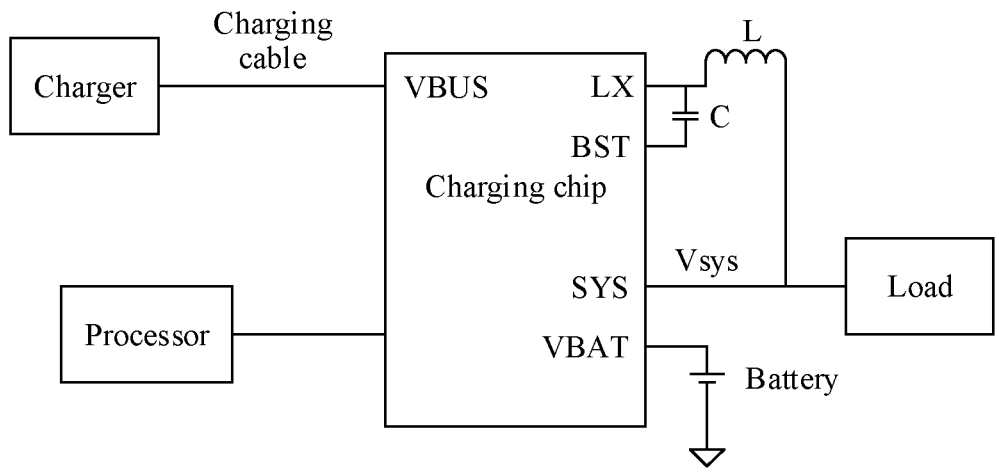
FIG. 1 is a schematic diagram of a charging circuit according to the prior art.

In a charging solution of an existing terminal device shown in FIG. 1, when a charger is connected for charging, a charging chip may convert an input power supply voltage into a charging voltage Vsys, and then convert and output a corresponding battery voltage by using a component (such as a switching transistor) at a battery supply end VBAT, where the battery voltage is used to charge a battery. To protect charging safety of the device, a constant voltage protection parameter and a Vdpm parameter are set for the charging chip immediately after the charger is connected. When the battery voltage reaches the constant voltage protection parameter, the battery enters a phase of the constant-voltage charge CV, to protect safety of a rechargeable battery. In the prior art, there are specifically the following two implementation solutions for setting the constant voltage protection parameter and Vdpm parameter.

In a first solution, an initial constant voltage protection parameter and an initial Vdpm parameter are set after the charger is connected, and the two parameters are no longer set in an entire subsequent charging process of the device. Consequently, a battery charging speed cannot be flexibly adjusted, and the charging duration is relatively long, especially when a battery voltage of the device is relatively low.

In a second solution, the initial constant voltage protection parameter and Vdpm parameter may be set after the charger is connected, and Vdpm parameter may be dynamically adjusted based on the battery voltage in a charging cycle, and the constant voltage protection parameter remains unchanged. The battery voltage is an actual voltage of the battery. As shown in FIG. 1, the battery voltage is an actual voltage of the VBAT. However, in practice, it is found that when Vdpm parameter is set to be relatively low (that is, Vdpm parameter is in a low level), if Vdpm parameter fails to be updated due to a system breakdown or another fault, that is, Vdpm parameter cannot be set to a high level. Consequently, a buck transistor buck inside the charging chip may be punched through, and the charging chip may be damaged; and even a register of the charging chip may be overwritten, the battery voltage may exceed the constant voltage protection parameter, and potential safety hazards such as a battery explosion during charging may occur.

Figure 2A:
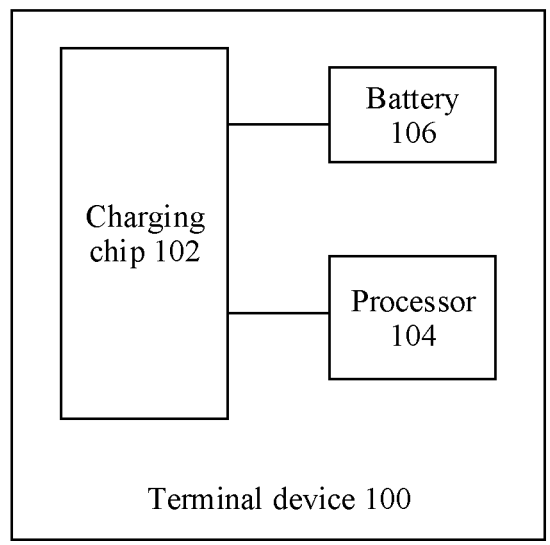
FIG. 2A is a schematic structural diagram of a terminal device according to an embodiment of the present invention.

To resolve the foregoing problems, refer to FIG. 2A. FIG. 2A is a schematic architecture diagram of a terminal device according to an embodiment of the present invention. The terminal device 100 shown in FIG. 2A includes a charging circuit used for device charging, where the charging circuit may include a charging chip 102, a processor 104, and a battery 106. The charging chip 102 is configured to convert a power supply voltage into a battery voltage to charge the battery 106, where the power supply voltage is greater than a limiting power supply voltage, and the battery voltage is less than a limiting battery voltage. The processor 104 is configured to: when a first condition is met, increase both the limiting power supply voltage and the limiting battery voltage, or decrease a charging current while increasing the limiting battery voltage, where the first condition includes at least that the battery voltage is greater than a battery voltage threshold. The processor 104 is further configured to: when a second condition is met, decrease both the limiting power supply voltage and the limiting battery voltage, or increase the charging current while decreasing the limiting battery voltage, where the second condition includes at least that the battery voltage is less than the battery voltage threshold.

In this application, the limiting power supply voltage is a minimum limiting voltage at a charging input end of the charging chip. Specifically, the limiting power supply voltage may be an allowable minimum limiting voltage set by the charging input end, that is, the foregoing Vdpm, for example, a minimum limiting voltage Vdpm parameter of the VBUS end shown in FIG. 1. The limiting battery voltage is a maximum limiting voltage at the battery power supply end of the charging chip, and may be specifically an allowable maximum limiting voltage set by the battery power supply end, that is, the foregoing constant voltage protection parameter, for example, a maximum limiting voltage parameter of the VBAT end shown in FIG. 1. The power supply voltage refers to an actual voltage at the charging input end of the charging chip, for example, an actual voltage at a VBUS end shown in FIG. 1. The battery voltage refers to an actual voltage at the battery power supply end of the charging chip, for example, an actual voltage at a VBAT end shown in FIG. 1.

In an optional embodiment, the charging circuit includes but is not limited to a switching charging circuit and a linear charging circuit. In different charging circuits, the processor 104 may compare the battery voltage with the battery voltage threshold, and then correspondingly adjust a corresponding charging parameter. The battery voltage threshold may be independently set on a user side or a terminal device side, and this is not limited in the present invention.

For example, in the switching charging circuit, when the battery voltage is greater than the battery voltage threshold, both the limiting power supply voltage (Vdpm) and the limiting battery voltage may be increased. In the linear charging circuit, when the battery voltage is greater than the battery voltage threshold, the limiting power supply voltage (that is, the constant voltage protection parameter) may be increased, or the charging current may be decreased while the limiting power supply voltage is increased. The charging current refers to a magnitude of a current that is used for charging the battery 106 and that is output by the battery power supply end of the charging chip. Correspondingly, in the switching charging circuit, when the battery voltage is less than the battery voltage threshold, both the limiting power supply voltage (Vdpm) and the limiting battery voltage may be decreased. In the linear charging circuit, when the battery voltage is less than the battery voltage threshold, the limiting battery voltage may be decreased, or the charging current may be increased while the limiting battery voltage is decreased. The following describes in detail how to adjust related parameters in the charging circuit.

It should be understood that, in a charging process of the terminal device, after the charger is connected, an impedance (resistance) exists between an output port of the charger and the charging input end of the charging chip. It is assumed that an input voltage of the charger is V0, the limiting power supply voltage set at the charging input end (as the VBUS shown in FIG. 1) of the charging chip is Vdpm, and an impedance of a charging link is R (as an impedance between an adaptor and the VBUS end shown in FIG. 1). Correspondingly, it can be learned from Ohm's law I=(V0−Vdpm)/R that, for a given R, I is proportional to a voltage difference (V0−Vdpm) on a charging cable. When die battery voltage is less than the battery voltage threshold (to be specific, a residual battery capacity is less than a preset capacity value), the charging current should be increased, to be specific, Vdpm should be decreased, to shorten the charging duration. Correspondingly, when the battery voltage (a battery capacity) is greater than the battery voltage threshold, the charging current should be decreased, to be specific, Vdpm should be increased to protect charging safety of the device battery.

By implementing this embodiment of the present invention, the following problems with the prior art can be avoided: The charging speed of a device cannot be flexibly adjusted, and the charging duration is excessively long because Vdpm and the constant voltage protection parameter are set once; the charging chip is damaged or the battery explodes during charging because Vdpm is not updated in time, and the like.

It should be noted that, in actual application, the charging chip 102 in the terminal device shown in FIG. 2A may include a processor, and the processor of the charging chip 102 and the processor 104 may be a same physical processor, to be specific, the processor 104 may also be disposed on the charging chip 102. For details, refer to FIG. 2B, which is a schematic architectural diagram of another possible terminal device.

Figure 2B:
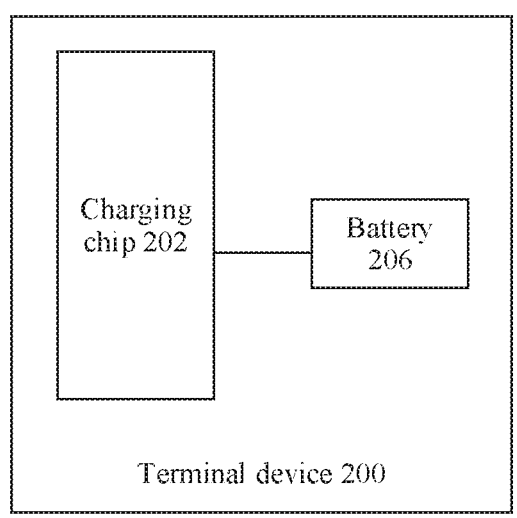
FIG. 2B is a schematic structural diagram of still another terminal device according to an embodiment of the present invention.

As shown in FIG. 2B, the terminal device 200 includes a charging circuit used for device charging, and the charging circuit may include a charging chip 202 and a battery 206.

The charging chip 202 is configured to convert a power supply voltage into a battery voltage to charge the battery 206, where the power supply voltage is greater than a limiting power supply voltage, and the battery voltage is less than a limiting battery voltage.

The charging chip 202 is further configured to: when a first condition is met, increase both the limiting power supply voltage and the limiting battery voltage, or decrease both a charging current while increasing the limiting battery voltage, where the first condition includes at least that the battery voltage is greater than a battery voltage threshold.

The charging chip 202 is further configured to: when a second condition is met, decrease both the limiting power supply voltage and the limiting battery voltage, or increase a charging current while decreasing the limiting battery voltage, where the second condition includes at least that the battery voltage is less than the battery voltage threshold.

For a part that is not shown or not described in this embodiment of the present invention, refer to related descriptions in the foregoing embodiment in FIG. 2A. Details are not described herein again.

Figure 3:
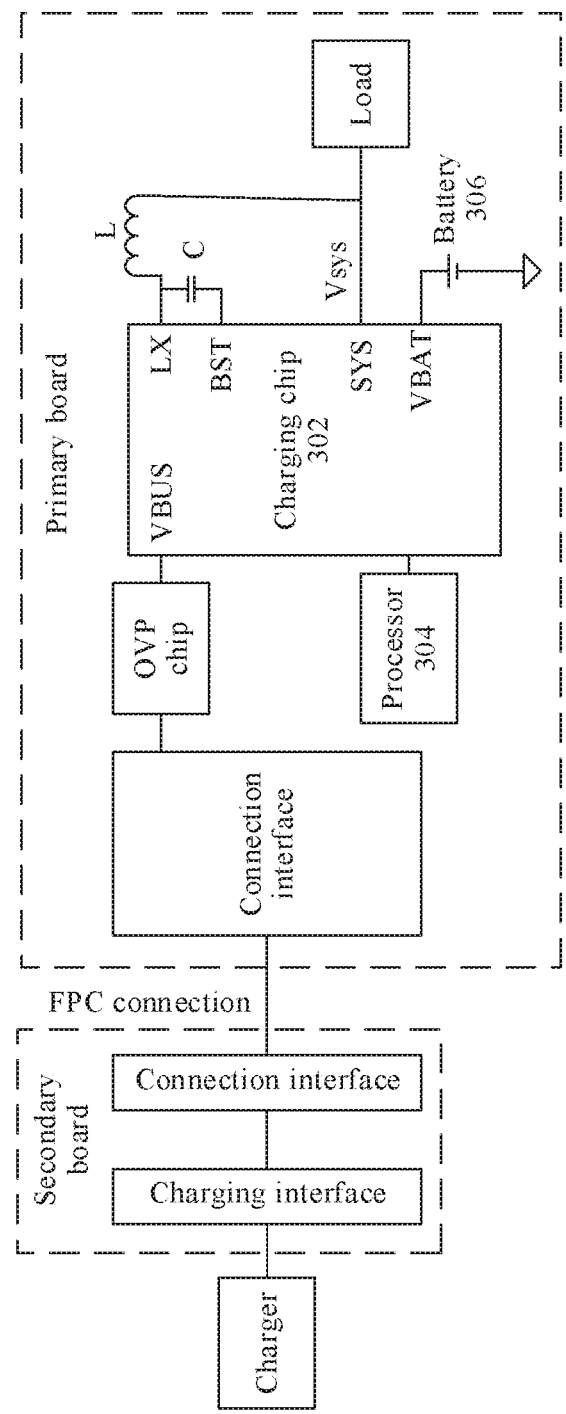
FIG. 3 is a schematic diagram of a switching charging circuit according to an embodiment of the present invention.
Figure 4:
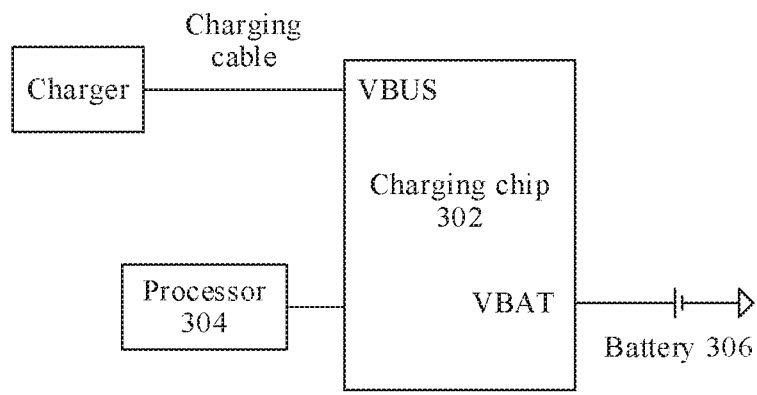
FIG. 4 is a schematic structural diagram of still another terminal device according to an embodiment of the present invention.
Figure 5:
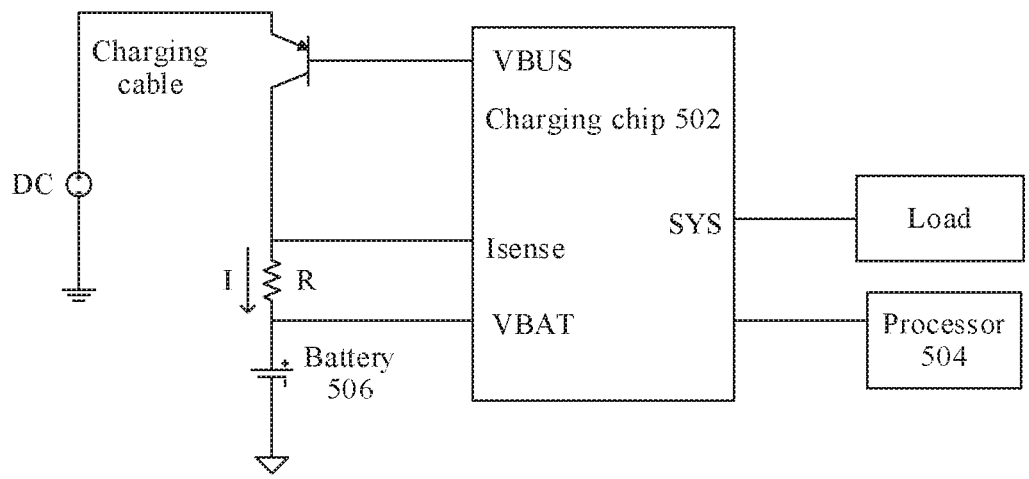
FIG. 5 is a schematic diagram of a linear charging circuit according to an embodiment of the present invention.
Figure 6:
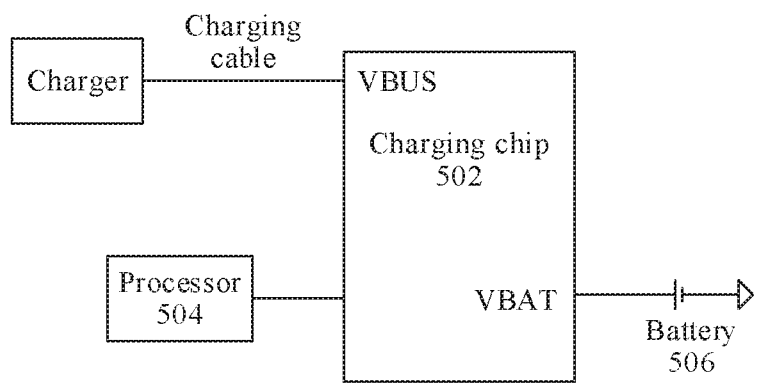
FIG. 6 is a schematic structural diagram of still another terminal device according to an embodiment of the present invention.

In the following embodiments of the present invention, the terminal device shown in FIG. 2A is used as an example to describe in detail two charging circuits and the charging control embodiments of the terminal device corresponding to the two charging circuits used in the present invention. FIG. 3 and FIG. 4 show related embodiments of the switching charging circuit according to the present invention. FIG. 5 and FIG. 6 show related embodiments of the linear charging circuit according to the present invention.

FIG. 3 is a schematic diagram of the switching charging circuit. The switching charging circuit 300 may include a charging chip 302, a processor 304, and a battery 306. The charging chip 302 is electrically connected to both the processor 304 and the battery 306.

In an optional embodiment, the charging chip may include a charging input end VBUS and a battery power supply end VBAT. The charging input end may be externally connected to a power supply (such as an external charger), to input a power supply voltage. The battery power supply end is electrically connected to the battery 306, to output a charging current or a charging voltage to charge the battery.

In an optional embodiment, the processor may be electrically connected to the charging chip by using an inter-integrated circuit (inter-integrated circuit, I2C) bus. The I2C bus may include a system clock line (system clock line, SCL) and a serial data line (serial data, SDA). Details are not described in this application.

In an optional embodiment, the switching charging circuit may further include a load (load), and the charging chip is electrically connected to the load. Optionally, the switching charging circuit may further include a peripheral device. For example, in FIG. 3, the charging chip may further include a capacitor C and an inductor L. The charging chip may further include a first port, a second port, and a third port, and corresponding ports are LX port, BST port, and SYS port in the figure. The LX port is electrically connected to the load by using the inductor. The BST port is electrically connected to the LX port and one end of the inductor by using the capacitor. The SYS port is electrically connected to the load.

In an optional embodiment, the switching charging circuit further includes an overvoltage protection (overvoltage protection, OVP) chip, primary and secondary board connection interfaces, and a charging interface. The OVP chip is configured to protect the charging chip, and control an actual voltage at a charging input end of the charging chip to not exceed a chip upper limit threshold. The chip upper limit threshold may be independently set on a user side or a terminal device side, and this is not described in much detail in the present invention. The primary and secondary board connection interfaces are configured to electrically connect a primary board and a secondary board, and the primary board may include but is not limited to the charging chip 302, the processor 304, the battery 306, and components of subsequent optional embodiments such as a load, an OVP chip, and a connection interface of the primary board. The secondary board may include but is not limited to a connection interface of the secondary board and a charging interface, as specifically shown in FIG. 3. The primary and secondary board connection interfaces may be connected by using a flexible printed circuit (flexible printed circuit, FPC). The charging interface is configured to externally connect a charging power supply to input a power supply voltage to the charging chip, where the charging interface includes but is not limited to a universal serial bus (universal serial bus, USB) interface.

In an optional embodiment, when the switching charging circuit is used for charging, the charging interface may be externally connected to a charger or an adaptor, as specifically shown in FIG. 3. Related components used in the present invention are not described much detail in this application.

Based on the schematic diagram of the switching charging circuit shown in FIG. 3, FIG. 4 is a schematic structural diagram of a terminal device according to an embodiment of the present invention. The terminal device may include all or some of connected components of the switching charging circuit in the embodiment shown in FIG. 3. This is not limited in the present invention. FIG. 4 only shows that the terminal device includes a charging chip 302, a processor 304, and a battery 306. The following describes specific embodiments related to these components.

The charging chip 302 is configured to convert a power supply voltage into a battery voltage to charge the battery 306, where the power supply voltage is greater than a limiting power supply voltage, and the battery voltage is less than a limiting battery voltage.

The processor 304 is configured to: when a first condition is met, increase both the limiting power supply voltage and the limiting battery voltage, where the first condition includes at least that the battery voltage is greater than a battery voltage threshold.

The processor 304 is further configured to: when a second condition is met, decrease both the limiting power supply voltage and the limiting battery voltage, where the second condition includes at least that the battery voltage is less than the battery voltage threshold.

The following describes some specific embodiments and optional embodiments used in the present invention.

After the charger is connected to the terminal device for charging, the processor 304 may determine whether the first condition is met. If the first condition is met, the processor 304 may increase both the limiting power supply voltage (Vdpm) and the limiting battery voltage (that is, a constant voltage protection parameter). The first condition may include that the battery voltage is greater than the battery voltage threshold. For the battery voltage, the battery voltage threshold, the limiting power supply voltage, and the limiting battery voltage, refer to related descriptions in the foregoing embodiments. Details are not described herein again.

During specific implementation, the processor 304 may send a first acquisition instruction to the charging chip 302, where the first acquisition instruction is used to obtain a voltage at the battery power supply end (VBAT) of the charging chip, that is, a battery voltage in this application. Correspondingly, the charging chip 302 may receive the first acquisition instruction, collect a voltage (that is, the battery voltage) at the battery power supply end based on the first acquisition instruction, and feed back the voltage at the battery power supply end to the processor 304. Then, the processor 304 may adjust related parameters in the charging circuit based on the obtained battery voltage. For example, when the processor 304 determines that the battery voltage is greater than or equal to the battery voltage threshold (for example, 4.08 V), both the limiting power supply voltage (Vdpm) and the limiting battery voltage may be increased. If the processor 304 determines that the battery voltage is less than the battery voltage threshold (for example, 4.08 V), both the limiting power supply voltage (Vdpm) and the limiting battery voltage may be decreased.

In an optional embodiment, the first condition or the second condition may further include that a test voltage is less than a preset threshold, and/or a target quantity of times exceeds a preset quantity of times. The test voltage may refer to a voltage at the charging input end that is actually detected after the charger is connected to the terminal device, or a voltage at the charging input end that is detected by the charging chip by using a test current. The target quantity of times is a quantity of times that the test voltage is less than a preset threshold. The preset threshold and the preset quantity of times may be independently set on the user side or the terminal device side. Optionally, the preset threshold may be a default limiting power threshold set by the system, such as 4.675 V, or a threshold customized by another user/system, and this is not limited in the present invention. The following describes two implementations used during specific implementation.

In a first implementation, before the processor 304 sends the first acquisition instruction to the charging chip 302, the processor 304 may send a read instruction to the charging chip 302, where the read instruction is used to read whether the charging chip is in a DPM state, and the DPM state is configured to indicate that the test voltage is less than or equal to the preset threshold. Optionally, the DPM state may be configured to indicate that the test voltage triggers the preset threshold, and the test voltage is less than or remains at the preset threshold.

Correspondingly, the charging chip may receive the read instruction, and feeds back the state of the charging chip to the processor based on an instruction of the read instruction.

The state of the charging chip includes being in the DPM state or not being in the DPM state. The state may be preset by the charging chip. Details are described below When the processor 304 determines that the charging chip is in the DPM state (to be specific, the test voltage is less than or equal to the preset threshold), the processor 304 may continue to send the first acquisition instruction to the charging chip 302, to adjust both the limiting power supply voltage Vdpm and the limiting battery voltage (that is, the constant voltage protection parameter) based on the obtained battery voltage.

In an optional embodiment, a state of the charging chip may be identified by using a preset character string. The preset character string includes but is not limited to preset letters, preset numbers, and the like. For example, "0" may be used to indicate that the charging chip is not in the DPM state, and "1" may be used to indicate that the charging chip is in the DPM state.

In an optional embodiment, the state of the charging chip may be preset by the charging chip. In one specific implementation, to ensure data reliability, after the charger is connected to the terminal device, the charging chip may collect, after a first preset duration, the voltage at the charging input end (VBUS) for use as the test voltage. When the test voltage is less than or equal to a preset threshold, the charging chip may mark that the charging chip is in the DPM state, for example, mark a state of the charging chip as "1". Correspondingly, when the test voltage is greater than the preset threshold, the charging chip may mark that the charging chip is not in the DPM state, for example, mark the state of the charging chip as "0".

In another specific implementation, after the charger is connected to the terminal device, the charging chip may record a magnitude of a current on a serial data line, and the current is used as a first current. The serial data line is a cable connected to the charger and the charging chip (that is, the terminal device), and may also be referred to as a charging cable. Because specifications of charging cables produced by different manufacturers are different (that is, impedances of the charging cables are different), the charging chip may detect a voltage at a charging input end of the charging chip by using a test current, and the voltage is used as the test voltage. Specifically, the charging chip may set a current on the charging cable to be a test current (for example, 900 mA, mA), and collect, after a second preset duration, the voltage at the charging input end for use as the test voltage. Then, when it is determined that the test voltage is less than or equal to a preset threshold, the charging chip marks that the charging chip is in the DPM state. Correspondingly, when it is determined that the test voltage is greater than the preset threshold, the charging chip marks that the charging chip is not in the DPM state.

In an optional embodiment, the test current and the second preset duration may be independently set on a user side or a terminal device side. This is not limited in the present invention. After the charging chip marks whether the charging chip is in the DPM state, the charging chip may reset a current of the charging cable to the first current, where the first current is a current of the charging cable when the charger is connected to the terminal device for normal charging.

In an optional embodiment, to ensure accuracy of parameter adjustment and high reliability of device charging control, the processor 304 may obtain the state of the charging chip for a plurality of times. If a quantity of times of the charging chip that is in the DPM state exceeds a preset quantity of times (that is, a quantity of times that the test voltage is less than a preset threshold), the processor 304 may continue to perform a subsequent procedure to send a first acquisition instruction to the charging chip 302, to adjust related parameters in the charging circuit based on the obtained battery voltage, for example, both the limiting power supply voltage Vdpm and the limiting battery voltage.

In an optional embodiment, when the processor 304 determines that the charging chip is in the DPM state or the quantity of times of the charging chip that is in the DPM state exceeds a preset quantity of times, the processor 304 may determine that the terminal device is currently in a weak charging state, where the weak charging state is associated with the DPM state or the quantity of times of the DPM state. Correspondingly, the processor 304 may continue to perform the subsequent procedure to adjust the related parameters in the charging circuit based on the obtained battery voltage, for example, the limiting power supply voltage Vdpm and the limiting battery voltage. On the contrary, when the processor 304 determines that the charging chip is not in the DPM state, or the quantity of times of the charging chip that is in the DPM state does not exceed the preset quantity of times, the processor 304 may determine that the terminal device is currently in a non-weak charging state, and may end the subsequent procedure.

In a second implementation, before the processor 304 sends a first acquisition instruction to the charging chip 302, the processor 304 may directly send a second acquisition instruction to the charging chip 302, where the second acquisition instruction is used to obtain a test voltage at a charging input end of the charging chip. Correspondingly, after receiving the second acquisition instruction, the charging chip collects the test voltage at the charging input end based on an instruction of the second acquisition instruction, and feeds back the test voltage to the processor 304. Further, the processor 304 may compare the obtained test voltage with a preset threshold, and when the test voltage is less than or equal to the preset threshold, may send the first acquisition instruction to the charging chip 302, to adjust related parameters based on an obtained battery voltage. When the test voltage is greater than the preset threshold, a procedure may be ended. The following describes two specific implementations for obtaining the test voltage.

In one specific implementation, the processor 304 sends a second acquisition instruction to the charging chip 302. Correspondingly, the charging chip 302 receives the second acquisition instruction, and obtains a voltage at the charging input end (VBUS) based on the instruction of the second acquisition instruction for use as the test voltage.

In another specific implementation, the processor 304 sends a second acquisition instruction to the charging chip 302. Correspondingly, the charging chip 302 receives the second acquisition instruction, and the charging chip may record a magnitude of a current on the serial data line, and the current is used as a first current. Next, the charging chip 302 may use a voltage at a charging input end of the charging chip that is detected by the test current as the test voltage. For details, refer to related descriptions in the foregoing first implementation. Details are not described herein again.

In an optional embodiment, the processor 304 may further determine an impedance on the serial data line. Specifically, the processor 304 may determine an impedance R1 on the serial data line based on a target pressure difference V1 and a current I on the serial data line. $V1=I*R1$, where V1, I, and R1 are all positive numbers. The target voltage difference V1 is a difference between an output voltage Vout of the charger and the test voltage Vin.

In an optional embodiment, to ensure accuracy of parameter adjustment and high reliability of device charging control, the processor 304 may obtain a test voltage at a charging input end of the charging chip for a plurality of times. When a quantity of times that the test voltage is less than or equal to a preset threshold (that is, a target quantity of times) exceeds a preset quantity of times, the processor 304 may continue to perform a subsequent procedure. Details are not described herein again. On the contrary, when the quantity of times that the test voltage is less than or equal to the preset threshold does not exceed the preset quantity of times, procedures may be ended, and the related parameters (for example, Vdpm and a constant voltage protection parameter) in the charging circuit are not adjusted.

In an optional embodiment, when the processor 304 determines that the test voltage is less than or equal to a preset threshold, or the quantity of times that the test voltage is less than or equal to the preset threshold exceeds a preset quantity of times, the processor 304 may determine that the terminal device is in a weak charging state, and further, may continue to adjust the related parameters in the charging circuit based on the obtained battery voltage. Details are not described herein again. On the contrary, when the processor 304 determines that the test voltage is less than or equal to the preset threshold, or the quantity of times that the test voltage is less than or equal to the preset threshold does not exceed the preset quantity of times, the processor 304 may determine that the terminal device is in a non-weak charging state, procedures may be ended, and the related parameters in the charging circuit are not adjusted.

In an optional embodiment, the first condition may further include that the battery voltage is in a rising period. Optionally, the second condition may further include that the battery voltage is in the rising period or the battery voltage is in a dropping period.

During specific implementation, the charging chip 302 may record, in real time or periodically, a voltage at the battery power supply end (VBAT), that is, the battery voltage in this application. A recording form of the battery voltage is not limited in the present invention, for example, stored in a form such as a data table, a vector, or a matrix. The processor 304 may obtain the battery voltage recorded in a third preset duration, and analyze these battery voltages, to determine whether the battery voltage in the third preset duration is in the rising period or the dropping period. For example, if the battery voltage recorded in the third preset duration gradually increases with time, it indicates that the battery voltage is in the rising period; or if the battery voltage recorded in the third preset duration gradually decreases with time, it indicates that the battery voltage is in the dropping period. The third preset duration may be independently set on a user side or a terminal device side, and this is not limited in the present invention.

Correspondingly, the processor 304 may adjust both the limiting power supply voltage (Vdpm) and the limiting battery voltage based on the obtained battery voltage. Specifically, when it is determined that the battery voltage is in the rising period and the battery voltage is greater than a battery voltage threshold (that is, a first condition is met), the processor 304 may increase both the limiting power supply voltage (Vdpm) and the limiting battery voltage. Correspondingly, when it is determined that the battery voltage is less than the battery voltage threshold, regardless of whether the battery voltage is in the rising period or the dropping period (that is, a second condition is met), the processor 304 may decrease both the limiting power supply voltage Vdpm and the limiting battery voltage.

In an optional embodiment, when the second condition further includes that the battery voltage is in the rising period, the battery voltage threshold is a first battery voltage threshold; or when the second condition further includes that the battery voltage is in the dropping period, the battery voltage threshold is a second battery voltage threshold, where the first battery voltage threshold is greater than the second battery voltage threshold.

To ensure stability of parameter adjustment, a voltage hysteresis interval can be set. Specifically, the processor 304 may obtain a battery voltage within the third preset duration. If the processor learns, through analysis, that the battery voltage is in the rising period, and the battery voltage is less than or equal to the first battery voltage threshold, both the limiting power supply voltage Vdpm and the limiting battery voltage may be decreased. Correspondingly, if the processor learns, by analyzing, that the battery voltage is in the dropping period, the voltage hysteresis interval may be set, to be specific, the battery voltage is less than or equal to the second battery voltage threshold, both the limiting power supply voltage Vdpm and the limiting battery voltage may be decreased. The first battery voltage threshold is greater than the second battery voltage threshold, and the voltage hysteresis interval is from the first battery voltage threshold to the second battery voltage threshold.

A battery of 4.4 V and a charger of 5 V (that is, the charger is connected to a charging power supply of 5 V) are used as an example. After the charger is connected to the terminal device to charge the battery, the charging chip 302 may record a first current on a charging cable, where the charging cable is a serial data line used to connect the charger to the terminal device. Further, the charging chip may detect a voltage at the charging input end of the charging chip on the charging cable by using a test current, and after the first preset duration (for example, a latency of 100 ms), collect a voltage at the charging input end for use as the test voltage. When it is determined that the test voltage is less than or equal to a preset threshold (4.675 V is used as an example), the charging chip may mark that the charging chip is in a DPM state (or a weak charging state); otherwise, the charging chip marks that the charging chip is not in the DPM state. Correspondingly, the charging chip may further reset the current on the charging cable to the first current, to restore normal charging of the terminal device.

Correspondingly, the processor 304 may send a read instruction to the charging chip to read whether the charging chip is in the DPM state. After the processor 304 determines, through reading, that the charging chip is not in the DPM state, it may be determined that the terminal device is currently in a non-weak charging state, and a procedure is ended. After the processor 304 determines, through reading, that the charging chip is in the DPM state, it may be determined that the terminal device is currently in the weak charging state; and then the processor 304 may obtain a voltage at a battery power supply end of the charging chip, that is, the battery voltage in this application.

Next, the processor may adjust both the limiting power supply voltage (Vdpm) and the limiting battery voltage (that is, the constant voltage protection parameter) based on the battery voltage. For details about Vdpm and the constant voltage protection parameter, refer to related descriptions in the foregoing embodiment. Details are not described herein again. For example, when the battery voltage is in the rising period and the battery voltage is greater than the first battery voltage threshold (for example, 4.08 V), the processor may adjust the limiting power supply voltage (Vdpm) to a high level (for example, 4.675 V) and the limiting battery voltage to a 4.4 V, or the like. When the battery voltage is in the rising period and the battery voltage is less than or equal to the first battery voltage threshold 4.08 V, the processor may adjust the limiting power supply voltage (Vdpm) to a low level (for example, 4.46 V) and the limiting battery voltage to 4.15 V, or the like. When the battery voltage is in the dropping period, the voltage hysteresis interval (for example, 280 mV millivolt) may be set, to be specific, the battery voltage is less than or equal to the second battery voltage threshold (4.08 V−0.28 V=3.8 V), the processor may adjust the limiting power supply voltage (Vdpm) to a low level (for example, 4.46 V) and the limiting battery voltage to 4.15 V, or the like.

It should be understood that, in an initial charging phase of the terminal device, to be specific, the battery voltage is less than or equal to the first battery voltage threshold, to shorten charging duration, a charging current should be increased. Refer to related descriptions in the foregoing embodiment described in FIG. 2A. I=(V0 to Vdpm)/R, where V0 is a charging power source 5 V, and R is an impedance of a charging cable. For a given impedance of the charging cable, to increase the charging current I, Vdpm should be decreased. Correspondingly, when a battery capacity exceeds a specified threshold, to be specific, when the battery voltage is greater than the first battery voltage threshold, to ensure charging safety of a battery, a charging current should be decreased. Referring to the foregoing description, for the given impedance on the charging cable, to reduce the charging current I, Vdpm should be increased.

In an optional embodiment, when the charger is connected to the terminal device for charging, the processor 304 may further record charging duration of the terminal device, so that a user can view the charging duration of the device, and intuitively understand that the charging duration of the terminal device can be shortened after this application is used. Table 1 provides an example of a test data table. The test data table intuitively reflects that the charging duration of the terminal device after use of this application is definitely less than charging duration of the terminal device in a conventional technology.

ohms or 0.5 ohms shown in Table 1) can be connected in series to the standard serial data line, and a plurality of serial data lines are used for test under a same test condition. It can be intuitively learned from Table 1 that the charging duration may be significantly shortened by correspondingly adjusting related parameters (for example, the limiting power supply voltage Vdpm and the limiting battery voltage (that is, a constant voltage protection parameter)) on a charging circuit by using this embodiment of this application.

In an optional embodiment, after a charger is connected for charging, the processor may obtain the battery voltage in real time or periodically, to adjust the related parameters of the charging circuit based on the battery voltage, for example, the limiting battery voltage and the limiting power supply voltage Vdpm. Optionally, when detecting that the battery is full charged, the processor may instruct to remove the charger, to end charging.

By implementing this embodiment of the present invention, the following problem with the prior art may be overcome: A charging chip is damaged because the limiting power supply voltage Vdpm cannot be updated in time, or a potential safety hazard such as battery explosion occurs during charging because a register is overwritten, or a charging speed cannot be flexibly adjusted, and the charging duration is excessively long because a limiting power supply voltage Vdpm is set once in the prior art. The charging duration can be shortened while charging safety of the terminal device is ensured.

FIG. 5 is a schematic diagram of a linear charging circuit. The linear charging circuit 500 may include a charging chip 502, a processor 504, and a battery 506. The charging chip 502 is electrically connected to both the processor 504 and the battery 506. For the charging chip, the processor, and the battery, refer to related descriptions in the foregoing embodiments. Details are not described herein again.

In an optional embodiment, the switching charging circuit may further include a load (load), and the charging chip is electrically connected to the load. Optionally, the linear charging circuit may further include an amplifier Q1, a resistor R, a charging interface, or another peripheral device.

TABLE 1

| Test condition | Sample number | Actual total impedance of a cable (ohm) | Charging duration detected when this application is not used | Charging duration detected when this application is used | Yield time | Average yield time |
|---|---|---|---|---|---|---|
| 0.75 ohm connected in series to a standard serial data line | 1 | 0.954 | 5 h 59 min | 4 h 50 min | 1 h 09 min | 70 min |
| | 2 | 0.908 | 5 h 43 min | 4 h 30 min | 1 h 13 min | |
| | 3 | 0.98 | 6 h 03 min | 4 h 55 min | 1 h 08 min | |
| 0.5 ohm connected in series to a standard serial data line | 4 | 0.693 | 4 h 12 min | 3 h 33 min | 39 min | 30 min |
| | 5 | 0.729 | 3 h 44 min | 3 h 20 min | 24 min | |
| | 6 | 0.954 | 5 h 59 min | 4 h 50 min | 1 h 09 mm | |

It may be learned from Table 1 that the foregoing standard serial data line refers to a data cable used to connect the charger to the terminal device, that is, the foregoing charging cable. Impedances of standard serial data lines produced by different manufacturers are different, that is, impedances of some serial data lines are relatively low, and impedances of some serial data lines are relatively high. Therefore, in the test procedure, to ensure accuracy of test data, an impedance of an appropriate size (for example, the impedance of 0.75

For example, in FIG. 5, the linear charging circuit further includes an amplifier Q1 and a resistor R, and the charging chip further includes a first port (shown as an Isense end in the figure). A base of Q1 is electrically connected to a charging input end (VBUS) of the charging chip, a collector of Q1 is electrically connected to the battery 506 by using the resistor R, the Isense end of the charging chip is electrically connected to one end of the collector of Q1 and the resistor R, a battery power supply end (VBAT) of the charging chip is electrically connected to the other end of the battery and the resistor R, and an emitter of Q1 is electrically connected to the charging interface.

In an optional embodiment, each port (or pin) of the charging chip has a corresponding voltage withstand range. If a port voltage exceeds the voltage withstand range specified by the port, the charging chip is damaged. As shown in FIG. 5, a battery of 4.4 V is used as an example, and the voltage withstand range of the Isense end of the charging chip is 0 to 4.5 V. Correspondingly, in a charging process, it needs to be ensured that the Isense end of the charging chip cannot exceed 4.5 V, to eliminate the risk of over-voltage damage.

In an optional embodiment, when charging is performed by using the linear charging circuit, the charging interface may be externally connected to a direct current (direct current, DC), for example, a battery is charged by using a charger, as specifically shown in FIG. 5. For related components used in the present invention, refer to related descriptions in the foregoing embodiments. Details are not described herein again.

Based on the schematic diagram of the linear charging circuit shown in FIG. 5, FIG. 6 is a schematic structural diagram of a terminal device according to an embodiment of the present invention. The terminal device may include all or some of connected components of the linear charging circuit in the embodiment shown in FIG. 5. This is not limited in the present invention. FIG. 6 only shows that the terminal device includes a charging chip 502, a processor 504, and a battery 506. The following describes specific embodiments related to these components.

The charging chip 502 is configured to convert a power supply voltage into a battery voltage to charge the battery 506, where the power supply voltage is greater than a limiting power supply voltage, and the battery voltage is less than a limiting battery voltage.

The processor 504 is configured to: when a first condition is met, increase the limiting battery voltage, or decrease a charging current while increasing the limiting battery voltage, where the first condition includes at least that the battery voltage is greater than a battery voltage threshold.

The processor 504 is further configured to: when a second condition is met, decrease the limiting battery voltage, or increase the charging current while decreasing the limiting battery voltage, where the second condition includes at least that the battery voltage is less than the battery voltage threshold.

The following describes some specific embodiments and optional embodiments used in the present invention.

After the charger is connected to the terminal device for charging, the processor 504 may send a read instruction to the charging chip 502, where the read instruction is used to obtain a battery voltage, and the battery voltage is a voltage at a battery power supply end of the charging chip 502. Correspondingly, the charging chip receives the read instruction, and reads the voltage at the battery power supply end based on an instruction of the read instruction, that is, the battery voltage in this application.

Further, the processor 504 may adjust the limiting battery voltage (that is, a constant voltage protection parameter) based on the battery voltage, or adjust both the limiting battery voltage and a charging current. For the limiting battery voltage and the charging current, refer to related descriptions in the foregoing embodiments. Details are not described herein again.

During specific implementation, as shown in FIG. 5, the charging chip may obtain the battery voltage and the charging current by detecting voltages at two ends of the resistor R. Correspondingly, the processor may control/adjust a magnitude of the charging current by adjusting the base of Q1 (also referred to as a control end). Specifically, when it is determined that the battery voltage is greater than the battery voltage threshold, the processor 504 increases the limiting battery voltage, or decreases the charging current while increasing the limiting battery voltage. On the contrary, when it is determined that the battery voltage is less than the battery voltage threshold, the processor 504 decreases the limiting battery voltage, or increases the charging current while decreasing the limiting battery voltage. The battery voltage threshold may be independently set on a user side or a terminal device side, and this is not limited in the present invention.

A battery of 4.4 V is used as an example. As shown in FIG. 5, in a charging process, the processor may obtain a voltage (that is, the battery voltage in this application) at the battery power supply end (VBAT) from the charging chip. Correspondingly, the processor may correspondingly adjust related parameters in the charging circuit based on a threshold range in which the battery voltage is located. For example, when the battery voltage is less than or equal to a first battery voltage threshold (for example, 4.24 V), the processor may decrease a maximum limiting voltage (that is, the limiting battery voltage or a constant voltage protection parameter) at the battery power supply end to a first battery voltage (for example, 4.25 V), and optionally may increase the charging current I to a first charging current (for example, 1 A) by adjusting the collector of Q1. When the battery voltage is greater than the first battery voltage threshold 4.24 V and less than or equal to a second battery voltage threshold (for example, 4.29 V), the processor may increase the limiting battery voltage to a second battery voltage (for example, 4.3 V), and optionally, may decrease the charging current I to a second charging current (for example, 0.7 A). Correspondingly, when the battery voltage is greater than the second battery voltage threshold 4.29 V, the processor may increase the limiting battery voltage to a third battery voltage (for example, 4.35 V), and optionally, may decrease the charging current I to a third charging current (for example, 0.45 A). The first battery voltage is less than the second battery voltage, and the second battery voltage is less than the third battery voltage. The first charging current is greater than the second charging current, and the second charging current is greater than the third charging current.

In an optional embodiment, after a charger is connected for charging, the processor may obtain the battery voltage in real time or periodically to adjust the related parameters in the charging circuit based on the battery voltage, for example, the limiting battery voltage and the charging current. Optionally, when detecting that the battery is full charged, the processor may instruct to remove the charger, to end charging.

For content that is not described in this embodiment of the present invention, refer to related descriptions in the embodiments shown in FIG. 2A to FIG. 5. Details are not described herein again.

By implementing this embodiment of the present invention, the charging duration can be shortened while charging safety of the terminal device is ensured.

Figure 7:
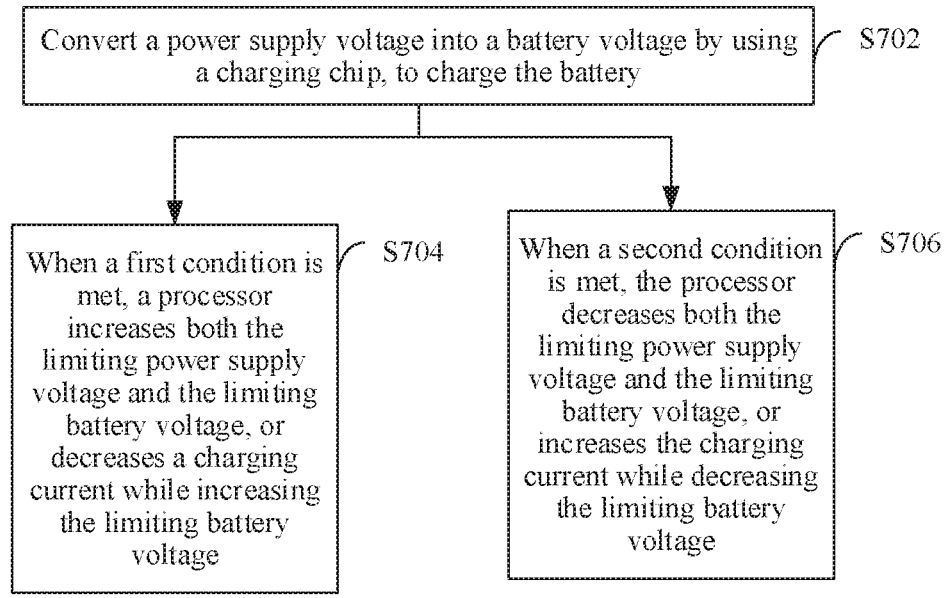
FIG. 7 is a schematic flowchart of a charging control method according to an embodiment of the present invention.

Based on a same invention concept, the following describes a method embodiment corresponding to the present invention. FIG. 7 is a schematic flowchart of a charging control method according to an embodiment of the present invention. The charging control method shown in FIG. 7 includes the following implementation steps:

Step S702. The terminal device converts a power supply voltage into a battery voltage by using a charging chip, to charge the battery, where the power supply voltage is greater than a limiting power supply voltage, the battery voltage is less than a limiting battery voltage, the limiting power supply voltage is a minimum limiting voltage at a charging input end of the charging chip, and the limiting battery voltage is a maximum limiting voltage at a battery power supply end of the charging chip;

Step S704. When a first condition is met, the terminal device increases both the limiting power supply voltage and the limiting battery voltage by using a processor, or decreases a charging current while increasing the limiting battery voltage by using the processor;

Step S706. When a second condition is met, the terminal device decreases both the limiting power supply voltage and the limiting battery voltage by using the processor, or increases, by using the processor, the charging current while decreasing the limiting battery voltage, where the charging current is a current used to charge the battery, the first condition includes at least that the battery voltage is greater than a battery voltage threshold, and the second condition includes at least that the battery voltage is less than the battery voltage threshold.

In this application, to implement the charging of the terminal device, a charging circuit is disposed in the terminal device, where the charging circuit includes but is not limited to a switching charging circuit, a, linear charging circuit, and the like. The charging circuit indication includes a charging chip, a processor, a battery, and some other components, for example, a load. For details, refer to related descriptions in the foregoing embodiments. Details are not described herein again.

In an optional embodiment, the limiting power supply voltage is a minimum limiting voltage at a charging input end (VBUS) of the charging chip, that is, the foregoing Vdpm. The limiting battery voltage is a maximum limiting voltage at a battery power supply end (VBAT) of the charging chip, that is, the foregoing constant voltage protection parameter. The power supply voltage refers to an actual voltage at the charging input end of the charging chip. The battery voltage refers to an actual voltage at the battery power supply end of the charging chip. The charging current refers to a current used to charge the battery, for example, a charging current passing through a resistor R that is shown in FIG. 5.

In an optional embodiment, when the charging circuit is a switching charging circuit, to be specific, when both the limiting power supply voltage and the limiting battery voltage are decreased, the first condition may further include that a test voltage is less than a preset threshold and/or a target quantity of times exceeds a preset quantity of times, where the target quantity of times refers to a quantity of times that the test voltage is less than the preset threshold.

Correspondingly, when the charging circuit is a switching charging circuit, to be specific, when both the limiting power supply voltage and the limiting battery voltage are increased, the first condition may further include that the test voltage is less than the preset threshold and/or the target quantity of times exceeds the preset quantity of times, where the target quantity of times refers to a quantity of times that the test voltage is less than the preset threshold.

The test voltage is a voltage detected at a charging input end of the charging chip. Specifically, the test voltage may be an actual voltage that is detected at the charging input end after the charger is connected to the terminal device.

Alternatively, the test voltage may be a test voltage detected at the charging input end by using a test current. For details, refer to related descriptions in the foregoing embodiment. Details are not described herein again.

In an optional embodiment, when the charging circuit is the switching charging circuit, to be specific, when both the limiting power supply voltage and the limiting battery voltage are decreased, the first condition further includes that the battery voltage is in a rising period.

In an optional embodiment, when the charging circuit is the switching charging circuit, to be specific, when both the limiting power supply voltage and the limiting battery voltage are decreased, the second condition further includes that the battery voltage is in the rising period, or the battery voltage is in a dropping period.

In an optional embodiment, in the switching charging circuit, when the second condition further includes that the battery voltage is in the rising period, the battery voltage threshold is a first battery voltage threshold; or when the second condition further includes that the battery voltage is in the dropping period, the battery voltage threshold is a second battery voltage threshold. The first battery voltage threshold is greater than the second battery voltage threshold.

It should be noted that, in this application, step S704 and step S706 may be performed in parallel, to be specific, the terminal device may perform either of step S7104 and step S706. This not limited in the present invention.

For content that is not described in this embodiment of the present invention, refer to related descriptions in the embodiments described in FIG. 2A to FIG. 6. Details are not described herein again.

By implementing this embodiment of the present invention, the charging duration of the terminal device can be shortened while charging safety of the terminal device is ensured.

The foregoing mainly describes the solutions provided in the embodiments of the present invention from a perspective of the terminal device. It may be understood that, to implement the foregoing functions, the terminal device includes corresponding hardware structures and/or software modules for performing the functions. With reference to the units and algorithm steps described in the embodiments disclosed in the present invention, embodiments of the present invention can be implemented in a form of hardware or hardware and computer software. Whether a function is performed by hardware or hardware driven by computer software depends on particular applications and design constraints of the technical solutions. A person skilled in the field may use different methods to implement the described functions for each particular application, but it should not be considered that the implementation falls beyond the scope of the technical solutions in the present invention.

In the embodiments of the present invention, a message processing device may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that, in this embodiment of the present invention, unit division is merely an example, and is merely a logical function division. In actual implementation, another division manner may be used.

Figure 8A:
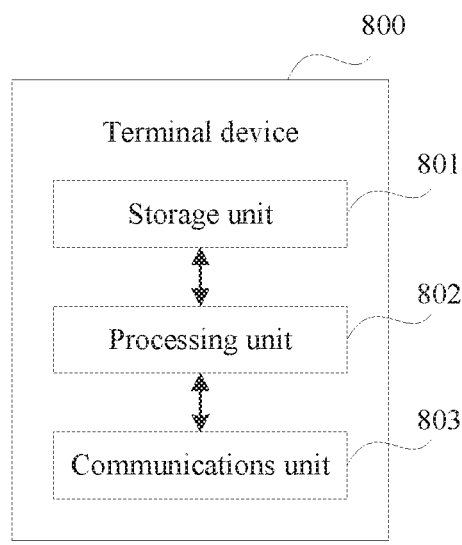
FIG. 8A is a schematic structural diagram of still another terminal device according to an embodiment of the present invention.

When an integrated unit is used, FIG. 8A is a possible schematic structural diagram of the terminal device in the foregoing embodiments. The terminal device 800 includes a processing unit 802 and a communications unit 803. The processing unit 802 is configured to control and manage an action of the terminal device 800. For example, the processing unit 802 is configured to support the terminal device 800 in performing S702, S704 and S706 in FIG. 7, and/or is configured to perform other steps of a technology described in this specification. The communications unit 803 is configured to support communication between the terminal device 800 and other terminal devices. For example, the communications unit 803 is configured to support the terminal device 800 in performing data communication with the charger, and/or is configured to perform other steps of the technology described in this specification. The terminal device 800 may further include a storage unit 801, configured to store program code and data of the terminal device 800.

The processing unit 802 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logic device, a transistor logic device, a hardware component, or a combination thereof. The processing unit 802 may implement or execute various example logical blocks, modules, and circuits described with reference to content disclosed in the present invention. Alternatively, the processor may be a combination for implementing a computing function, for example, a combination of one or more microprocessors, or a combination of the DSP and a microprocessor. The communications unit 803 may be a communications interface, a transceiver, a transceiver circuit, or the like. The communications interface is a general name, and may include one or more interfaces, for example, an interface between a message processing device and a terminal device. The storage unit 801 may be a memory.

In this application, the processing unit 802 may be the processor and the charging chip in the foregoing embodiment shown in FIG. 2A, or may be a charging chip in the foregoing embodiment shown in FIG. 2B, This not limited in the present invention.

Figure 8B:
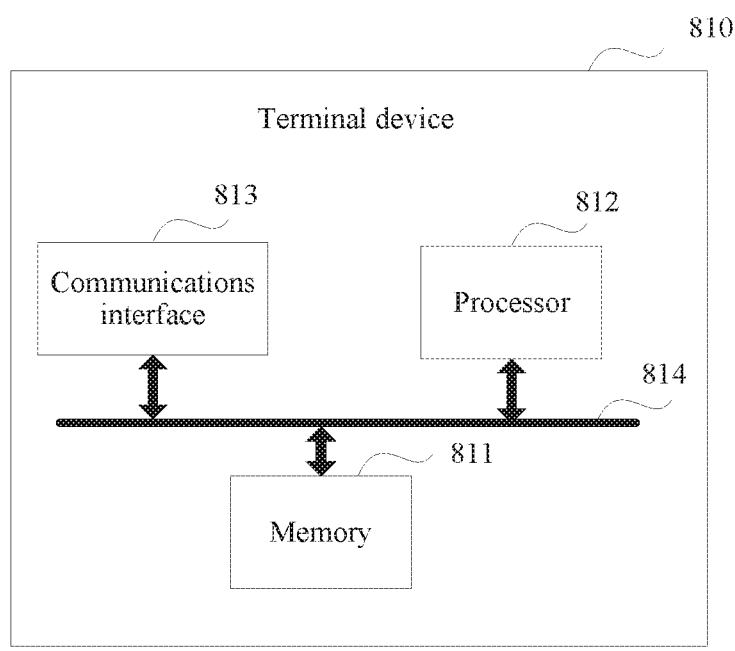
FIG. 8B is a schematic structural diagram of still another terminal device according to an embodiment of the present invention.

When the processing unit 802 is a processor, the communications unit 803 is a communications interface, and the storage unit 801 is a memory, the terminal device in this embodiment of the present invention may be a terminal device shown in FIG. 8B.

As shown in FIG. 8B, the terminal device 810 includes: a processor 812, a communications interface 813, and a memory 811. Optionally, the terminal device 810 may further include a bus 814. The communications interface 813, the processor 812, and the memory 811 are mutually connected by using the bus 814. The bus 814 may be a peripheral component interconnect (Peripheral Component Interconnect, PCI) bus, an extended industry standard architecture (Extended industry Standard Architecture, EISA) bus, or the like. The bus 814 may be classified into an address bus, a data bus, a control bus, and the like. For ease of representation, only one thick line is used to represent the bus in FIG. 8B, but this does not mean that there is only one bus or only one type of bus.

For specific implementation of the message processing device shown in FIG. 8A or FIG. 8B, refer to corresponding descriptions of the embodiments shown in FIG. 2A to FIG. 7. Details are not described herein again.

Figure 9:
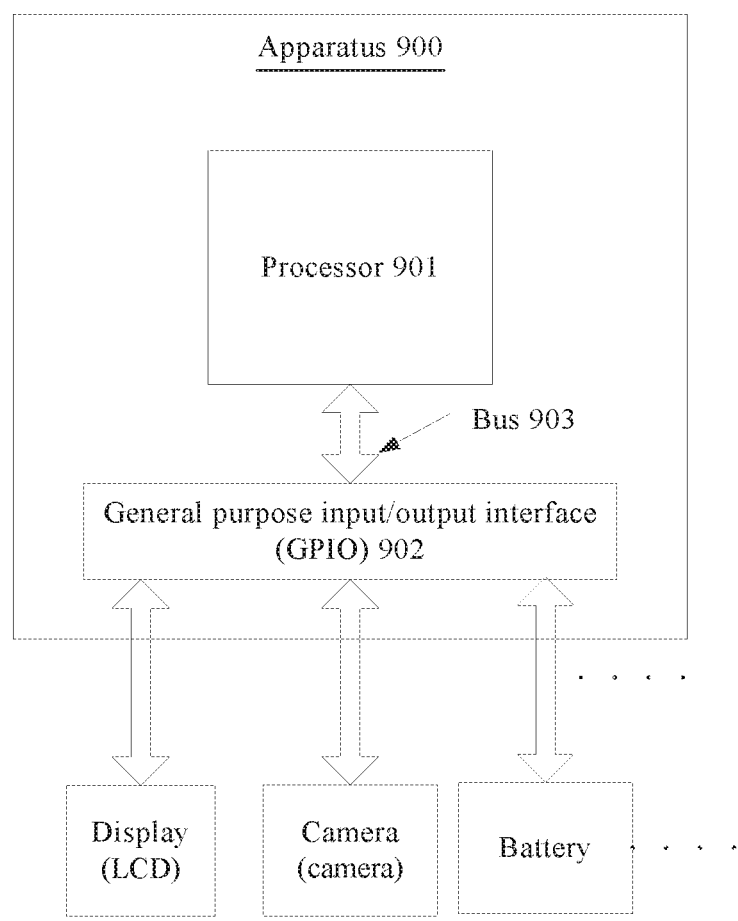
FIG. 9 is a schematic structural diagram of an apparatus according to an embodiment of the present invention.

FIG. 9 is a schematic structural diagram of an apparatus according to this application. As shown in FIG. 9, an apparatus 900 (for example, a charging chip) may include a processor 901 and one or more interfaces 902 coupled to the processor 901.

The terminal processor 901 may be configured to read and execute a computer readable instruction. During specific implementation, the processor 901 may mainly include a controller, an arithmetic unit, and a register. The controller is mainly responsible for decoding an instruction, and sends a control signal to an operation corresponding to the instruction. The arithmetic unit is mainly responsible for performing a fixed-point or floating-point arithmetic operation, a shift operation, a logic operation, and the like, and may also perform an address operation and an address conversion. The register is mainly responsible for saving a number of register operations temporarily stored during instruction execution, intermediate operation results, and the like. During specific implementation, the hardware architecture of the processor 901 may be an application-specific integrated circuit (Application Specific Integrated Circuits, ASIC) architecture, an MIPS architecture, an ARM architecture, an NP architecture, or the like. The processor 901 may be single-core or multi-core.

The interface 902 may be configured to input to-be-processed data to the processor 901, and may output a processing result of the processor 901. During specific implementation, the interface 902 may be a general purpose input output (General Purpose Input Output, GPIO) interface, and may be connected to a plurality of peripheral devices (such as a battery, a display (LCD), a camera, and a radio frequency module). The interface 902 may further include a plurality of independent interfaces, for example, a battery interface, an Ethernet interface, an LCD interface, and a camera interface. These interfaces are separately responsible for communication between different peripheral devices and the processor 901.

In this application, the processor 901 may be configured to invoke, from the memory, an implementation program of the charging control method provided in this application on a terminal device side, and execute an instruction included in the program. The interface 902 may be configured to output an execution result of the processor 901. In this application, the interface 902 may be specifically configured to output a battery voltage of the processor 901. For the charging control method provided in this application, refer to related descriptions in the foregoing embodiments, Details are not described herein again.

It should be noted that functions respectively corresponding to the processor 901 and the interface 902 may be implemented by hardware design, may be implemented by software design, or may be implemented in a combination of software and hardware. This is not limited herein.

Methods or algorithm steps described in combination with the content disclosed in this embodiment of the present invention may be implemented by hardware, or may be implemented by a processor by executing a software instruction. The software instruction may include a corresponding software module. The software module may be stored in a random access memory (Random Access Memory, RAM), a flash memory, a read only memory (Read Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or any other form of storage medium well-known in the art. An example storage medium is coupled to a processor, so that the processor can read information from the storage medium or write information into the storage medium. Certainly, the storage medium may be a component of the processor. The processor and the storage medium may be located in the ASIC. In addition, the ASIC may be located in a network device. Certainly, the processor and the storage medium may exist in the network device as discrete components.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium includes any medium that can store program code, such as a ROM, a RAM, a magnetic disk, or an optical disc.

What is claimed is:

1. A charging device, comprising:
a charging chip comprising a charging input end and a battery power supply end, wherein the charging chip is configured to convert a power supply voltage into a battery voltage to charge a battery, wherein the power supply voltage is greater than a limiting power supply voltage, wherein the battery voltage is less than a limiting battery voltage, wherein the limiting power supply voltage is a minimum limiting voltage at the charging input end, and wherein the limiting battery voltage is a maximum limiting voltage at the battery power supply end; and
a processor coupled to the charging chip and configured to:
increase both the limiting power supply voltage and the limiting battery voltage when a first condition is met, wherein the first condition comprises the battery voltage being greater than a battery voltage threshold; and
decrease both the limiting power supply voltage and the limiting battery voltage when a second condition is met, wherein the second condition comprises the battery voltage being less than the battery voltage threshold.

2. The charging device of claim 1, wherein the first condition further comprises that a test voltage at the charging input end is less than a preset threshold a preset quantity of times.

3. The charging device of claim 1, wherein the second condition further comprises that a test voltage at the charging input end is less than a preset threshold a preset quantity of times.

4. The charging device of claim 1, wherein the first condition further comprises that the battery voltage is in a rising period.

5. The charging device of claim 1, wherein the second condition further comprises that the battery voltage is in a rising period, or in a dropping period.

6. The charging device of claim 5, wherein the battery voltage threshold is a first battery voltage threshold when the battery voltage is in the rising period, wherein the battery voltage threshold is a second battery voltage threshold when the battery voltage is in the dropping period, and wherein the first battery voltage threshold is greater than the second battery voltage threshold.

7. A charging control method, comprising:
converting a power supply voltage into a battery voltage to charge a battery, wherein the power supply voltage is greater than a limiting power supply voltage, wherein the battery voltage is less than a limiting battery voltage, wherein the limiting power supply voltage is a minimum limiting voltage at a charging input end of a charging chip, and wherein the limiting battery voltage is a maximum limiting voltage at a battery power supply end of the charging chip;
increasing the limiting power supply voltage and the limiting battery voltage when a first condition is met, wherein the first condition comprises the battery voltage being greater than a battery voltage threshold; and
decreasing the limiting power supply voltage and the limiting battery voltage when a second condition is met, wherein the second condition comprises the battery voltage being less than the battery voltage threshold.

8. The charging control method of claim 7, wherein the first condition further comprises that a test voltage at the charging input end of the charging chip is less than a preset threshold a preset quantity of times.

9. The charging control method of claim 7, wherein the second condition further comprises that a test voltage at the charging input end of the charging chip is less than a preset threshold a preset quantity of times.

10. The charging control method of claim 7, wherein the first condition further comprises that the battery voltage is in a rising period.

11. The charging control method of claim 7, wherein the second condition further comprises that the battery voltage is either in a rising period, or in a dropping period.

12. The charging control method of claim 11, wherein the battery voltage threshold is a first battery voltage threshold when the battery voltage is in the rising period, wherein the battery voltage threshold is a second battery voltage threshold when the battery voltage is in the dropping period, and wherein the first battery voltage threshold is greater than the second battery voltage threshold.

13. The charging control method of claim 7, wherein the limiting battery voltage is a constant voltage protection parameter.

14. A computer program product comprising computer-executable instructions for storage on a non-transitory computer-readable medium that, when executed by a processor, cause an apparatus to:
convert a power supply voltage into a battery voltage to charge a battery, wherein the power supply voltage is greater than a limiting power supply voltage, wherein the battery voltage is less than a limiting battery voltage, wherein the limiting power supply voltage is a minimum limiting voltage at a charging input end of a charging chip, and wherein the limiting battery voltage is a maximum limiting voltage at a battery power supply end of the charging chip;
increase the limiting power supply voltage and the limiting battery voltage when a first condition is met, wherein the first condition comprises the battery voltage being greater than a battery voltage threshold; and
decrease the limiting power supply voltage and the limiting battery voltage when a second condition is met, wherein the second condition comprises the battery voltage being less than the battery voltage threshold.

15. The computer program product of claim 14, wherein the first condition further comprises that a test voltage at the charging input end of the charging chip is less than a preset threshold a preset quantity of times.

16. The computer program product of claim 14, wherein the second condition further comprises that a test voltage at the charging input end of the charging chip is less than a preset threshold a preset quantity of times.

17. The computer program product of claim 14, wherein the first condition further comprises that the battery voltage is in a rising period.

18. The computer program product of claim 14, wherein the second condition further comprises that the battery voltage is either in a rising period, or in a dropping period.

19. The computer program product of claim 18, wherein the battery voltage threshold is a first battery voltage threshold when the battery voltage is in the rising period, wherein the battery voltage threshold is a second battery voltage threshold when the battery voltage is in the dropping period, and wherein the first battery voltage threshold is greater than the second battery voltage threshold.

20. The computer program product of claim 14, wherein the limiting battery voltage is a constant voltage protection parameter.

\* \* \* \* \*